US012614429B2

(12) United States Patent
Amaitis et al.

(10) Patent No.: US 12,614,429 B2
(45) **Date of Patent: *Apr. 28, 2026**

(54) LOCATION-BASED ACCOUNT MANAGEMENT AND FRAUD-DETECTION SYSTEM FOR USE WITH MOBILE GAMBLING APPLICATIONS

(71) Applicant: INTERACTIVE GAMES LLC, New York, NY (US)

(72) Inventors: Lee Amaitis, Las Vegas, NV (US); Paul Williams, New York, NY (US)

(73) Assignee: INTERACTIVE GAMES LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/758,016

(22) Filed: Jun. 28, 2024

(65) Prior Publication Data

US 2024/0355176 A1 Oct. 24, 2024

Related U.S. Application Data

(63) Continuation of application No. 18/231,370, filed on Aug. 8, 2023, now abandoned, which is a
(Continued)

(51) Int. Cl.
*G07F 17/32* (2006.01)

(52) U.S. Cl.
CPC ...... *G07F 17/3244* (2013.01); *G07F 17/3223* (2013.01)

(58) Field of Classification Search
CPC ......................... G07F 17/3244; G07F 17/3223
(Continued)

(56) References Cited

U.S. PATENT DOCUMENTS 6,811,488 B2 * 11/2004 Paravia .................. G07F 17/32
709/227
10,657,766 B2 5/2020 Amaitis et al.
(Continued)

FOREIGN PATENT DOCUMENTS

JP 2004-054352 A 2/2004
JP 2005-202908 A 7/2005
(Continued)

OTHER PUBLICATIONS

Anonymously Disclosed. "A multi-tiered strategy for allowing access to sensitive player information on a gaming device" Jul. 18, 2008. IPCPM000172896D. pp. 1 to 3. (Year: 2008).*
(Continued)

*Primary Examiner* — Ambreen A. Alladin

(57) ABSTRACT

Apparatus and method provide for wagering across multiple gaming operators operating at respective locations, using respective accounts accessible according to a location of a player. The first and second accounts may be linked to a linking account, and money is transferrable between the linking account and each of the first and second accounts. The second account may be accessible by a player to place wagers associated with a second gaming operator at a second location, but not to place wagers associated with a first gaming operator operating at a first location. While a player is currently located at the second location, an amount of money from the first account may be transferred to the linking account and the amount of money from the linking account may be transferred to the second account.

20 Claims, 3 Drawing Sheets

Related U.S. Application Data continuation of application No. 17/866,649, filed on Jul. 18, 2022, now Pat. No. 11,769,370, which is a continuation of application No. 17/145,833, filed on Jan. 11, 2021, now Pat. No. 11,393,290, which is a continuation of application No. 16/871,966, filed on May 11, 2020, now Pat. No. 10,891,825, which is a continuation of application No. 13/288,223, filed on Nov. 3, 2011, now Pat. No. 10,657,766.

(60) Provisional application No. 61/477,777, filed on Apr. 21, 2011, provisional application No. 61/410,092, filed on Nov. 4, 2010.

(58) Field of Classification Search
USPC ............................................................ 463/25
See application file for complete search history.

(56) References Cited

U.S. PATENT DOCUMENTS

| | | | |
|---|---|---|---|
| 10,891,825 B2 | 1/2021 | Amaitis et al. | |
| 11,393,290 B2 | 7/2022 | Amaitis et al. | |
| 11,769,370 B2 | 9/2023 | Amaitis et al. | |
| 2002/0002075 A1 | 1/2002 | Rowe | |
| 2002/0082076 A1 | 6/2002 | Roser et al. | |
| 2003/0087701 A1 | 5/2003 | Paravia et al. | |
| 2003/0229418 A1 | 12/2003 | Huang | |
| 2005/0170883 A1 | 8/2005 | Muskin | |
| 2005/0209000 A1 | 9/2005 | Kusajima et al. | |
| 2006/0094499 A1 | 5/2006 | Amemiya et al. | |
| 2007/0060306 A1* | 3/2007 | Amaitis | G07F 17/32 463/25 |
| 2008/0026829 A1* | 1/2008 | Martin | G07F 17/32 463/25 |
| 2008/0113807 A1* | 5/2008 | Alderucci | G07F 17/3232 463/42 |
| 2008/0132329 A1* | 6/2008 | Jorasch | G07F 17/3244 463/25 |
| 2010/0048302 A1 | 2/2010 | Lutnick et al. | |
| 2023/0377416 A1 | 11/2023 | Amaitis et al. | |

FOREIGN PATENT DOCUMENTS

| | | | | |
|---|---|---|---|---|
| JP | 2006-216074 A | 8/2006 | | |
| JP | 2009110051 A | 5/2009 | | |
| WO | WO-2005072330 A2 * | 8/2005 | G07F 17/3244 | |
| WO | WO-2009033222 A1 | 3/2009 | | |
| WO | WO-2009128847 A1 | 10/2009 | | |

OTHER PUBLICATIONS

Anonymously Disclosed, "A multi-tiered strategy for allowing access to sensitive player information on a gaming device" Jul. 18, 2008. IPCPM000172896D. pp. 1 to 3. (2008).

Notification of International Search Report and Written Opinion for International Application No. PCT/US2011/059293 mailed on Mar. 16, 2012, 11 pages.

* cited by examiner

LOCATION-BASED ACCOUNT MANAGEMENT AND FRAUD-DETECTION SYSTEM FOR USE WITH MOBILE GAMBLING APPLICATIONS

CROSS REFERENCE TO RELATED APPLICATIONS

This application is a continuation of U.S. patent application Ser. No. 18/231,370 filed Aug. 8, 2023, which is a continuation of U.S. patent application Ser. No. 17/866,649 filed Jul. 18, 2022 (now U.S. Pat. No. 11,769,370 issued Sep. 26, 2023), which is a continuation of U.S. patent application Ser. No. 17/145,833 filed Jan. 11, 2021 (now U.S. Pat. No. 11,393,290 issued Jul. 19, 2022), which is a continuation of U.S. patent application Ser. No. 16/871,966 filed on May 11, 2020 (now U.S. Pat. No. 10,891,825 issued Jan. 12, 2021), which is a continuation of U.S. patent application Ser. No. 13/288,223 filed on Nov. 3, 2011 (now U.S. Pat. No. 10,657,766 issued on May 19, 2020), which claims priority to U.S. Provisional Application No. 61/410,092 filed on Nov. 4, 2010 and U.S. Provisional Application No. 61/477,777 filed on Apr. 21, 2011, each of which is incorporated by reference herein in its entirety.

FIELD

Some embodiments may relate to wagering.

BACKGROUND

Some players may desire to play games that include wagers. Some people store money in one or more accounts.

SUMMARY

The following should be interpreted as example embodiments and not as claims.

FIGURES

DETAILED DESCRIPTION

Figure 1:
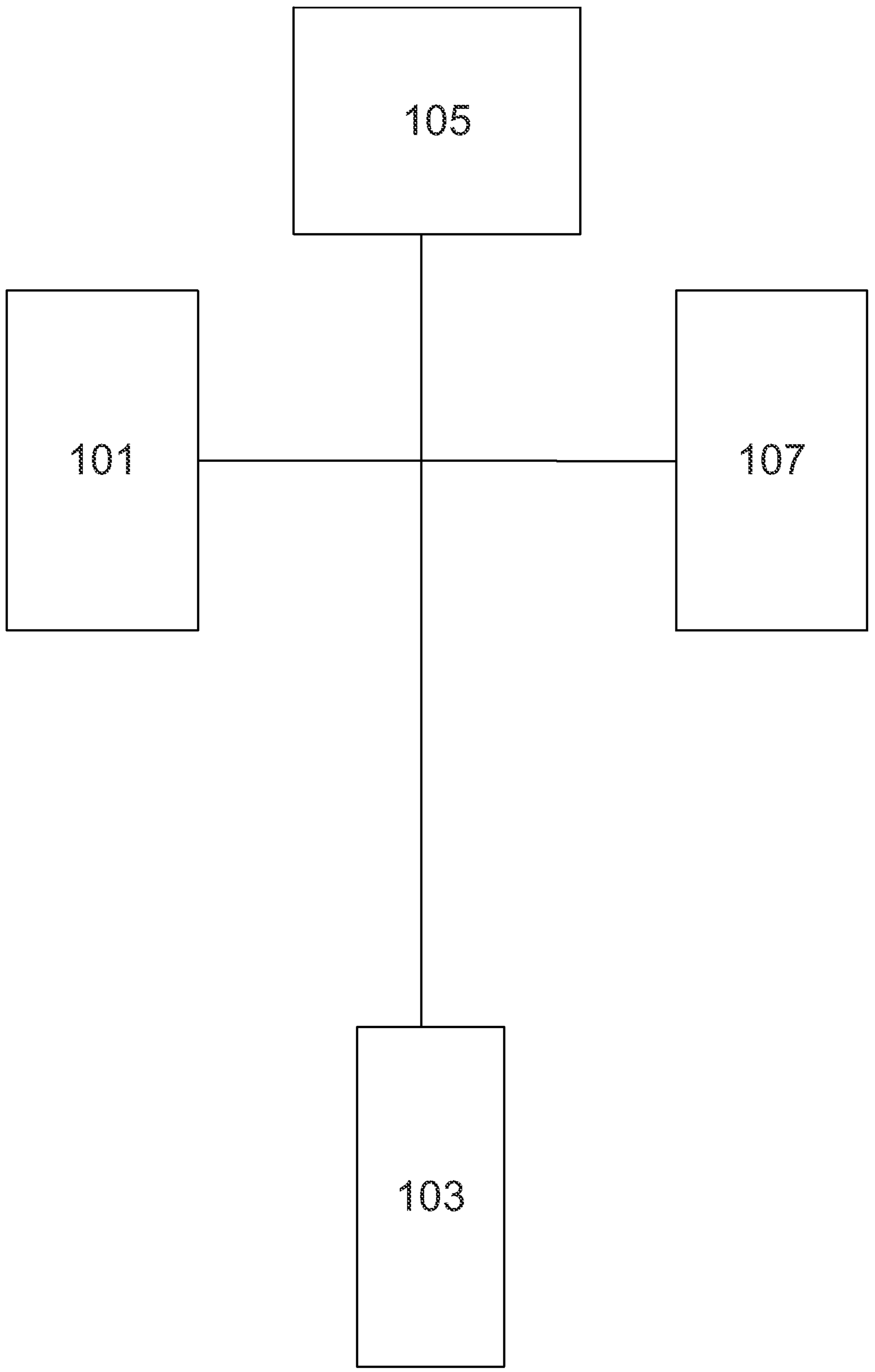
FIG. 1 illustrates an example architecture that may be used in some embodiments.

Some embodiments may include a plurality of accounts related to a plurality of respective casinos or other venues. In some embodiments, each such account may allow for gambling related to games and/or events at a particular casino, sports book, and so on. In some embodiments, for example, a user may have a respective monetary account for casino gambling associated with each of a plurality of gaming operators (e.g., casinos, sports books, mobile gaming providers, internet wagering sites) and a respective monetary account for sports betting associated with one or more of the plurality of gaming operators (e.g., casinos, sports books, mobile gaming providers, internet wagering sites).

Some embodiments may include preventing funds in one wagering account from being used within a casino or at a location not associated with that wagering account. Some embodiments may include preventing funds in one wagering account from being used to wager on and/or perform activities (e.g., making purchases, wager on casinos games, make sports bets) that are not approved for the account.

Some embodiments may include a feature that allows fund transferring from one wagering account to another wagering account. Such funds may be transferred between accounts associated with a same gaming operator and/or between accounts associated with different gaming operators.

In some embodiments, a transfer may include an adjustment to an electronic record that identifies an amount of money in an account. For example, a single gaming operator may reduce one account and may increase another account a same amount (e.g., intra property transfer between casino wagering and sport betting accounts). In some embodiments, multiple parties may be involved in a transfer. For example, a first gaming operator may reduce an account and a second gaming operator may increase an account by a same amount. In some embodiments, an intermediary (e.g., a mobile gaming operator or account operator) may provide accounting services on behalf on the one or more entities (e.g., may maintain accounts for multiple entities and so may make the adjustments on their behalf).

In some embodiments, such an account transfer feature may allow a user to grant permission for a transfer of an amount of money from one account. Some amount of money that is permissioned (or less) may be moved to another account. Accordingly, such money may be used from the other account to place wagers and/or perform activities even if the money may not be used from the account to place the same wagers and/or perform the same activities.

In some embodiments, a first account that is related to a first gaming provider may be established. For example, a first account may be related to a first casino (e.g., The M Resort) or first gaming service provider (e.g., mobile gaming provider such as Cantor Gaming). Such an account may be established by the first gaming provider, a user, and/or a financial institution (e.g., by signing up for an account and/or placing money in an account). A user may place money in and/or take money from such an account. Such an account may be used to place wagers on one or more games with money placed in the account. Such an account may be used to place wagers at the casino or first gaming provider and/or otherwise through the first gaming provider (e.g., using an app provided by the first gaming provider, when the first gaming provider takes the wager). In some embodiments, such an account may be associated with one or more activities (e.g., sports betting and/or casino wagering). In some embodiments multiple accounts associated with different activities may be established in relation to the first gaming provider (e.g., one for sports betting and one for casino wagering).

In some embodiments, a second account that is related to a second gaming provider may be established. For example, a second account may be related to a second casino (e.g., The Hard Rock Casino) or second gaming service provider (e.g., mobile gaming provider such as The Venetian Pocket Casino Service). Such an account may be established by the second gaming provider, a user, and/or a financial institution (e.g., by signing up for an account and/or placing money in an account). A user may place money in and/or take money from such an account. Such an account may be used to place wagers on one or more games with money placed in the account. Such an account may be used to place wagers at the second gaming provider and/or otherwise through the second gaming provider (e.g., using an app provided by the second gaming provider, when the second gaming provider takes the wager). In some embodiments, such an account may be associated with one or more activities (e.g., casino wagering and/or sports betting). In some embodiments multiple accounts associated with different activities may be established in relation to the second gaming provider (e.g., one for sports betting and one for casino wagering).

In some embodiments, a third account that is related to a first activity may be established. For example, a third account may be related to placing wagers on casino games (e.g., slots, blackjack, poker). Such an account may be established by a gaming provider, a user, and/or financial institution (e.g., by signing up for an account and/or placing money in an account). A user may place money in and/or take money from such an account. Such an account may be used to place wagers on one or more casino games with money placed in the account. Such an account may be limited to the first activity and/or may be excluded from being used for some second activity (e.g., sports and/or racing wagers). In some embodiments, such an account may be associated with one or more gaming providers.

In some embodiments, a fourth account that is related to a second activity (e.g., a second activity that the third account maybe excluded from being used for) may be established. Such an account may be established by a gaming provider, a user, and/or financial institution (e.g., by signing up for an account and/or placing money in an account). A user may place money in and/or take money from such an account. Such an account may be used to place wagers on one or more sports, racing, and/or other events with money placed in the account. Such an account may be limited to the second activity and/or may be excluded from being used for some first activity (e.g., casino game wagering). In some embodiments, such an account may be associated with one or more gaming providers (e.g., a same and/or different gaming provider as the third account).

In some embodiments, establishing an account may include receiving information by a gaming operator from a user, receiving money from a user, verifying information about the user, storing money in an account, storing information in a database, and so on. For example, in some embodiments, a user may provide identifying information to a gaming provider (e.g., name, age, address, social security number, driver's license number, etc.) to establish an account. The gaming provider may store such information in a database. The gaming provider may verify one or more portions of the information (e.g., by asking for a photo ID to verify age). Information establishing such verification may be stored in a database (e.g., a copy of an ID). Login information may be established for an account. In some embodiments, such information may be established in person at a gaming operator, through the Internet, through fax, over the phone, and so on as desired. In some embodiments, money may be placed in the account. For example, physical cash may be handed to a gaming operator and in response a database entry may be adjusted to show that the money is in the account. In some embodiments, electronic transfers into the account may be made (e.g., from another account) and a database entry may be made to identify that transfer.

In some embodiments, a single intermediary may maintain information related to multiple accounts related to multiple gaming operators (e.g., a mobile gaming provider may operate at multiple casinos and maintain accounts related to each casino). In some embodiments, such an intermediary may maintain a customer database in which account information for such multiple accounts may be stored. Some embodiments may include maintaining account consistency in such a database. For example, if a player changes their name or address associated with one account, such changes may be propagated through the customer database to affect all account. In some embodiments, the change may not affect other account. In some embodiments, the player may be given an option through a user interface to have the change propagated to other accounts (e.g., to choose which account to affect).

In some embodiments, when a player establishes a new account, the new account may be linked in the customer database with other accounts established by the player. For example, a database may be searched for identifiers entered by the player upon establishing the account to find if the player has already registered an account (e.g. the player may be asked for login information from a prior account establishment, social security numbers, driver's license number, other unique identifiers may be searched for). If a match to a player establishing a new account is found in a customer database, the new account may be associated in response with the previous customer entry and all accounts that have previously been associated with that customer. Such association may case a process maintaining an orderly customer profile, accounting for a customer, transferring money among customer accounts, monitoring for fraud (e.g., monitoring for multiple account usage simultaneously and taking anti-fraud action in response), and so on.

Some embodiments may relate to wagering at casinos and/or in legal gaming jurisdictions. Such wagering may be performed using money in one or more established account. Databases may be adjusted in response to wagered money, lost money, won money, transferred money, and so on. In some embodiments gaming jurisdictions and/or providers may require and/or desire to keep some money segregated from other money. Such treatment of money may improve accountability, tracking, assurance of credit worthiness, monitoring of activity, age verification, identity confirmation, and so on. For example, in some embodiments, each gaming provider (e.g., taker of bets, house, casino, mobile gaming provider) may require its own account (e.g., an account setup for wagering with each provider) to be setup to place wagers through the provider. As another example, racing and/or sports accounts may be required to be separate from casino gaming accounts. For example, a gaming provider that offers both sports/racing and casino gaming may require a user to establish both a sports/racing account and a casino account it that user desires to place account based wagering on both sports/racing and casino games through the gaming provider. In some embodiments, a separate account may be required for shopping and/or otherwise spending money. For example, wagering accounts may be prevented from being used to spend money to buy products. In some embodiments, a single account may be used for more than one activity, through more than one gaming provider and/or at more than one location.

It should be recognized that any combination of location, gaming provider, intermediary, activity, and/or other characteristics being associated with wagering and/or non-wagering accounts may be used in various embodiments as desired. Various examples of embodiments are given as non-limiting examples that may be combined together in any manner as desired. For example, some embodiments may include three separate accounts being associated with three respective activities for each of four separate locations. In some embodiments, as an example of some account types and/or associations, one account may be associated with wagering on sports at casino A, another account may be associated with playing casino games at casino B, a third account may be associated with shopping at store C, and a fourth account may be associated with investing at financial institute D.

Some embodiments may include facilitating transfer of money from one account (e.g., first account, third account) to another account (e.g., second account, fourth account). Such money may include money that was deposited in an account, money that was transferred into an account, money that was won through wagering activities, and so on. In some embodiments, an account to which money may be transferred may include an account associated with a gaming provider that the user is participating with (e.g., a casino in which a user is located) at a time relative to the transfer and/or an account from which money may be withdrawn may include a gaming provider that the user is not participating with (e.g., a casino in which the user is not located) at the time relative to the transfer.

In some embodiments, facilitating a transfer may include withdrawing money from one account and depositing the money into another account. Some embodiments may include taking a fee for such a service (e.g., for each transaction, a signup fee, etc.). In some embodiments, such a transfer may be facilitated by making one or more database changes. In some embodiments, accounting, auditing, and/or reporting may be performed regarding one or more transfers as desired by a regulatory body.

In some embodiments, facilitating may include pre-permissioning a transfer, requiring a transfer to be pre-permissioning, transferring a pre-permissioned amount of money, allow a user to pre-permissioning a transfer from an account, and so on. In some embodiments, facilitating may include automatically making a transfer, making a transfer from one account to another account in response to a wager being placed from the one account, transferring money to fulfill a wager, and so on.

Pre-Permissioning Examples

Some embodiments may include a pre-permissioning of a transfer of money. It should be recognized that descriptions of embodiments that may include a pre-permissioning may apply to embodiments that do not include such pre-permissioning. A pre-permissioning may allow a user to establish an account and/or an amount of money in an account that may be transferred from that account to another account (e.g., a particular other account, a set of other accounts using a system, any account).

Some embodiments may include providing a user with an interface through which a user may pre-permission a transfer of money. Such an interface may be provided through a gaming device (e.g., a mobile device, a stationary device). Such an interface may allow a user to establish an account as pre-permissioned for transfers. Such an interface may allow a user to enter an amount of money up to a current amount of money in an account, an amount of money less than and/or greater than an amount of money in an account, and so on. Such an interface may include an indication of an amount of money and/or an account from which such pre-permissioning will be made.

In some embodiments, such pre-permissioning may be general (e.g., to all accounts, to all accounts maintained by an intermediary). In some embodiments, such pre-permissioning may be selective (e.g., to specified account(s)). In some embodiments, a user interface may allow a user to identify to where pre-permissioned money may be transferred (e.g., select an account, select a set of accounts, etc.).

In some embodiments, such pre-permissioning may be time limited (e.g., for 1 minute, for 5 seconds, for 12 hours, for 1 year, for 1 decade, for 30 minutes, and so on). In some embodiments, such a pre-permissioning may not have a time limit associated therewith. In some embodiments, a user interface may allow a user to select a time limit.

Some embodiments may include determining an account and/or account information related to an account from which a user is/may pre-permission a transfer. In some embodiments, such an account may include an account related to a gaming provider that the user is participating with (e.g., a casino in which a user is located) at a time when the user requests and/or uses such an interface, completes a pre-permissioning, and so on. For example, a location of a device may be determined, the location may be determined to be associated with a casino, and in response to such a determination, money from the account may be allowed to be pre-permissioned. In some embodiments, an application being accessed, a network being accessed, a device that is logged into, an account that is logged into, and so on may be used to determine which if any account pre-permissioning may be made from (e.g., a casino account may be used if a network and/or device at the casino is logged into).

Some embodiments may allow pre-permissioning from accounts if the user is in a location approved for pre-permissioning (e.g., at a casino associated with an account). Some embodiments may not limit pre-permissioning locations. Functionality may be enabled and/or prohibited in response to a determination of a location. In some embodiments, various information may be used as a proxy for location. For example, a method of accessing an account, a geofence, a GPS coordinate, a triangulation, a last known location, an IP address, and so on may be used to determine location. In some embodiments, users may be prevented from accessing functionality if they are not accessing an approved network (e.g., cannot use M Resort functionality when not accessing the M Resort network or when accessing the Rock Hard Network).

Some embodiments may include preventing a user from pre-permissioning a transfer from an account related to a gaming provider that the user is not participating with (e.g., at a time of a request to pre-permission, at a time of a request for an interface, etc.), such as a casino in which a user is not located. Such prevention may include denying a request for an interface, ignoring a pre-permissioning, denying a request to pre-permission, and so on.

Some embodiments may allow pre-permissioning of accounts that the user is logged into. Some embodiments may include a single sign on that may be used to pre-permission from multiple accounts. For example, rather than separate logins for accounts, a single sign on may be used for multiple accounts. All accounts maintained by an intermediary may have a single sign in associating therewith. In some embodiments, that single sign in may have full functionality (e.g., a user may sign in and wager, transfer, withdraw, and so on from any account once signed in with the single sign in). In some embodiments, that single sign in may have limited functionality (e.g., a user may only be allowed to perform transfer functions, pre-permissioning functions, maintenance functions but not purchasing and/or wagering functions from the accounts when signed in using a single sign in). To use such other functions, a user may be required to sign into a specific account with an account and/or gaming operator level sign in. Functionality may be allowed and/or prohibited in response to a determination of a type of sign in that a user has made to access account information.

Some embodiments may include receiving an indication of a pre-permissioning. Such an indication may identify an amount of money to be pre-permissioned for transfer from an account. Such an indication may include any characteristic of the pre-permissioning (e.g., property, time, amount). In some embodiments, a pre-permissioning may relate to an entire current and/or future account value rather than and/or in addition to a specified or default amount of money. Such an indication may identify an account. Such an indication may identify a time of validity of such pre-permissioning. Such an indication may be received from a user, received from a computing device in response to a user entering a request through an interface, and/or otherwise received from any device and/or person desired in various embodiments. Such an indication may identify an entity that is pre-permissioned to make such a transfer (e.g., a transfer agent) and/or one or more accounts that such money may be pre-permissioned to be transferred to (e.g., pre-permission for some accounts but not all, or all accounts, a specific account, etc.). In some embodiments, such information may be established as a default value (e.g., all pre-permissioning for a particular account may permission a same agent and/or one or more accounts).

Some embodiments may record a pre-permissioning. Such recording may occur in response to receiving an indication of a pre-permissioning. For example, some embodiments may include recording in a database that a particular amount of money has been pre-permissioned to be transferred out of a particular account. Some embodiments may not include an amount of money, but rather may record that any balance may be allowed to be pre-permissioned to be transferred from an account (e.g., all current money, any future money, a default value, a maximum value, etc.). Such a record may be used by a casino and/or account provider to determine whether to allow future transfers out of an account.

Some embodiments may include monitoring a use of money in an account (e.g., an amount of dollars in an account). For example, in some embodiments, a pre-permissioned amount of money may be adjusted based on an amount of money remaining in an account. So that to determine the pre-permissioned amount, an account activity may be monitored. For example, if an account is fully permissioned to have all money transferred from it, a change in value of the account from $50 to $100 may increase a permissioned amount. As another example, if an account is permissioned to have $100 transferred from it and the value of the account drops from $200 to $50, then only $50 may be permissioned. If the value of that account raises to $100 or above in the future, then in some embodiments the $100 may be permissioned again. In other embodiments, only the $50 may be permissioned after such an increase.

Some embodiments may include providing an interface through which a user may transfer money from one account to another account and/or provide information about money that may be transferred. For example, a user may operate a mobile device by selecting a transfer control and in response, an interface allowing transfer of money may be provided. In some embodiments, such an interface may allow transferring to and/or from multiple accounts associated with multiple gaming operators (e.g., such as a single sign in account). In some embodiments, such an account may allow transferring to and/or from a limited number of accounts (e.g., into one account, into accounts associated with a particular gaming operator, out of one account, out of accounts associated with a particular gaming operator, etc.). In some embodiments, the accounts that may be transferred into or from may be determined based on a chosen software (e.g., an app related to an account), a login used (e.g., a login associated with an account), a location (e.g., a location associated with an account), and so on as desired.

Such an interface may include an interface of a computing device (e.g., a smart phone, a slot machine at a second casino different from a gaming provider associated with an account from which money is being transferred). Such an interface may identify an amount of money that is permissioned from one or more accounts, an identification of one or more accounts, and so on. In some embodiments a sum of available pre-permissioned money may be show that a user with and/or without further information specifying accounts from which such money is available. In some embodiments, such a sum may be determined from recorded and/or monitored account and/or pre-permissioning information. Such an interface may include an ability for a user to enter an amount of money to be transferred to an account (e.g., an account associated with a gaming provider that the user is currently associated with). In some embodiments, an interface may identify individual source accounts from which money may be transferred (e.g., into any account, into a set of accounts, into a chosen account, into a particular account, into an account based on login, location, etc.). Each such source account may be associated with an amount that may be transferred out (e.g., a pre-permissioned amount, a total amount). For example, an interface may list each of five accounts from which money may be transferred and respective amounts that have been pre-permissioned from each account. A user may be able to select one or more of those accounts to transfer money out of and into another account.

Some embodiments may include receiving an indication to transfer money to an account (e.g., operation of a control in a transferring interface). Such an indication may identify an account into which such money should be transferred. Such an indication may be received in response to a user entering a request through an interface. A destination account may be assumed based on a gaming provider that the user is associated with at a time of a transmission of and/or receipt of such an indication. In some embodiments, such an indication may identify an amount of money. In some embodiments, an amount of money may be assumed and/or determined based on a default, maximum, required, available, pre-permissioned, and so on amount. In some embodiment, such an indication may identify a source of such a transfer. For example, one or more identified accounts that were presented in an interface that identified pre-permissioned amounts. In some embodiments, such an indication may not identify a source (e.g., may identify that money should be transferred to an account without specifying from where). In some embodiment, such an indication may identify an account from which money is not to be transferred (e.g., a request to transfer money, but to leave all or some money in a particular account).

Some embodiments may include determining a source of funds and/or information about a source of funds. A source may be determined based on a selection by a user, based on pre-permissioned accounts, based on a location, and so on. For example, some embodiments may include determining that a source of fund has sufficient funds pre-permissioned and/or available to fulfill a transfer request. Some embodiments may include determining a set of accounts that have a sufficient amount pre-permissioned for transfer to fulfill a transfer request (e.g., a set of five accounts that when combined has a sufficient amount pre-permissioned to fulfill the transfer request). Such information may be determined from a record and/or tracked information about accounts and/or pre-permissioning.

Some embodiments may include facilitating a transfer of money from one or more accounts to another account. Such facilitating may be performed in response to receiving an indication requesting a transfer. Such facilitating may include performing a transfer, requesting funds, moving funds, accepting funds, withdrawing funds, depositing funds, taking control of funds, directing funds to be transferred, adjusting database entries, and so on. For example, some embodiments may include taking control of money from one account and placing that money in another account. As another example, some embodiments may include directing each of five accounts to transfer a respective amount of money from each account to another account. In some embodiments, an audit record may be maintained for all account transfer (e.g., a database of transfers may be maintained so that account activity may be reported in the future).

In some embodiments, money may be transferred to an account according to some rules. For example, in some embodiments, a transfer into an account may be prevented if one or more rules are not met. For example, a user may be required to be able to wager the money from the account in order to transfer the money into an account. As another example a user may be required to be in a casino associated with the account in order to transfer money into the account. As yet another example, a user may be required to be accessing a network or logged into an account to transfer money into an account.

In some example embodiments, a user may be required to be located in a location associated with a first account and logged in with a login associated with the first account to pre-permission a transfer from that first account. In some embodiments, a user may be required to be located in a location associated with a second account and logged in with a login associated with the second account to transfer money into the second account from the first account. Other embodiments may include no such requirements, fewer requirements, a single sign in, other requirements, network restrictions, and so on.

After a transfer, transferred money may be available in a recipient account and not one or more source accounts. Some embodiments may include a period of time during which the money is available in neither a source nor a recipient account (for some activity, for wagering, for withdrawal). For example, such period may allow a verification that the transfer happened successfully to occur, such a period may allow a possible delay in processing to be accounted for, such a period may prevent a user from withdrawing the transferred money from a source and a destination if an error occurred, and soon. Such a period may be longer than a processing period and/or transmission period. Such a period may include an artificial amount of time in addition to a processing and/or transmission period.

Some embodiments may not include a pre-permission of an account and/or an amount of money. In some embodiments, accounts may be pre-permissioned for an amount currently in them as a default. Money in an account may remain in the account after pre-permissioning and used as desired in accordance with rules of the account.

Below are some example tables that may illustrate some transfer transactions for example Cosmo and M Resort Race and Sports Accounts using an intermediary Cantor Wallet service account.

EXAMPLE 1

| Customer Action | Customers M Casino R&S Balance | Customers Cosmo R&S Balance | Cantor Wallet Permissioned Value | Total Balance across all Customer Accounts |
|---|---|---|---|---|
| Day 1 | | | | |
| Customer Physically deposits $100 into their M Casino R&S Account | $100.00 | $0.00 | $0.00 | $100.00 |
| Customer wins $50 on R&S Wager at the M Casino | $150.00 | $0.00 | $0.00 | $150.00 |
| Customer wants to leave the M and go to the Cosmo to meet friends but continue to gamble there. Customer pre-permissions $50 to their Wallet | $150.00 | $0.00 | $50.00 | $150.00 |
| Customer logins at the Comso and Inter-Company transfers $50 via the Wallet Pre-permission to their Comso R&S Account | $100.00 | $50.00 | $0.00 | $150.00 |
| Customer loses $25 wagering at the Comso and leaves for the day | $100.00 | $25.00 | $0.00 | $125.00 |
| Day 2 | | | | |
| Customer logins at the M Casino with only $100 available to them (M Casino only balance). | $100.00 | $25.00 | $0.00 | $125.00 |
| Customer loses all $100's on R&S at the M Casino. Customer does not have access to $25 at the Cosmo | $0.00 | $25.00 | $0.00 | $25.00 |
| Customer Physically deposits $200 into their M Casino R&S Account | $200.00 | $25.00 | $0.00 | $225.00 |
| Customer wins $110 on R&S Wager at the M Casino | $310.00 | $25.00 | $0.00 | $335.00 |
| Customer wants to leave the M and pre-permission their entire M Casino R&S balance as they haven't decided where they will wager the following day | $310.00 | $25.00 | $310.00 | $335.00 |

-continued

| Customer Action | Customers M Casino R&S Balance | Customers Cosmo R&S Balance | Cantor Wallet Permissioned Value | Total Balance across all Customer Accounts |
|---|---|---|---|---|
| Day 3 | | | | |
| Customer logins at the Comso and Inter-Company transfers $310 via the Wallet Pre-permission to their Comso R&S | $0.00 | $335.00 | $0.00 | $335.00 |
| Account Customer loses $200 wagering at the Cosmo | $0.00 | $135.00 | $0.00 | $135.00 |

EXAMPLE 2

| Customer Action | Customers M Casino R&S Balance | Customers Cosmo R&S Balance | Cantor Wallet Permissioned Value | Total Balance across all Customer Accounts |
|---|---|---|---|---|
| Day 1 | | | | |
| Customer Physically deposits $100 into their M Casino R&S Account | $100.00 | $0.00 | $0.00 | $100.00 |
| Customer wins $50 on R&S Wager at the M Casino | $150.00 | $0.00 | $0.00 | $150.00 |
| Customer intends to leave for the day and pre-permissions all $150 to their Wallet. | $150.00 | $0.00 | $150.00 | $150.00 |
| Customer continues to Wager at the M Casino and loses $100 | $50.00 | $0.00 | $50.00 | $50.00 |
| Customer leaves the M Casino | $50.00 | $0.00 | $50.00 | $50.00 |
| Day 2 | | | | |
| Customer Logins at the Comso and Attempts Inter-Company Transfer of $150. Transfer is denied on in-sufficient funds. Notification of only $50 is now available | $50.00 | $0.00 | $50.00 | $50.00 |
| Customer Inter-Company Transfers $50 to their Comso R&S Account | $0.00 | $50.00 | $0.00 | $50.00 |
| Customer Wagers and loses $25 at the Cosmo | $0.00 | $25.00 | $0.00 | $25.00 |

EXAMPLE 3

| Customer Action | Customers M Casino R&S Balance | Customers Cosmo R&S Balance | Cantor Wallet Permissioned Value | Total Balance across all Customer Accounts |
|---|---|---|---|---|
| Day 1 | | | | |
| Customer Physically deposits $100 into their M Casino R&S Account | $100.00 | $0.00 | $0.00 | $100.00 |
| Customer wins $50 on R&S Wager at the M Casino | $150.00 | $0.00 | $0.00 | $150.00 |
| Customer intends to leave for the day and pre-permissions all $150 to their Wallet. | $150.00 | $0.00 | $150.00 | $150.00 |
| Customer continues to Wager at the M Casino and wins $100 | $250.00 | $0.00 | $150.00 | $250.00 |
| Customer leaves the M Casino | $250.00 | $0.00 | $150.00 | $250.00 |
| Day 2 | | | | |
| Customer Logins at the Comso and Attempts Inter-Company Transfer of $250. Transfer is denied on limited to $150. Notification of only $150 is now available | $250.00 | $0.00 | $150.00 | $250.00 |
| Customer Inter-Company Transfers $150 to their Comso R&S Account | $100.00 | $150.00 | $0.00 | $250.00 |

-continued

| Customer Action | Customers M Casino R&S Balance | Customers Cosmo R&S Balance | Cantor Wallet Permissioned Value | Total Balance across all Customer Accounts |
|---|---|---|---|---|
| Customer Wagers and loses $25 at the Cosmo | $100.00 | $125.00 | $0.00 | $225.00 |

Below are some example tables that may illustrate some transfer transactions for example Cosmo and M Resort Race and Sports Accounts and a Cosmo Casino Wagering Account using an intermediary Cantor Wallet service account.

EXAMPLE 4

| Customer Action | Customers M Casino R&S Balance | Customers Cosmo R&S Balance | Customers Cosmo WGS Account | Cantor Wallet Permissioned Value | Total Balance across all Customer Accounts |
|---|---|---|---|---|---|
| Day 1 | | | | | |
| Customer Logins at the M Casino with $500 in their R&S M Account | $500.00 | $0.00 | $0.00 | $0.00 | $500.00 |
| Customer wins $50 on R&S Wager at the M Casino | $550.00 | $0.00 | $0.00 | $0.00 | $550.00 |
| Customer wants to use $200 in his Mobile Gaming Account so pre-permissions all $200 to their Wallet. | $550.00 | $0.00 | $0.00 | $200.00 | $550.00 |
| Customer Inter-Company Transfers $200 to their M Casino WGS Account | $350.00 | $0.00 | $200.00 | $0.00 | $550.00 |
| Customer Wins $20 play in WGS | $350.00 | $0.00 | $220.00 | $0.00 | $570.00 |
| Customer Loses all $350 wagering in their R&S M Casino Account | $0.00 | $0.00 | $220.00 | $0.00 | $220.00 |
| Customer logs out of WGS and pre-permissions all $220 to their Wallet | $0.00 | $0.00 | $220.00 | $220.00 | $220.00 |
| Customer Inter-Company Transfers $220 to their M Casino R&S Account | $220.00 | $0.00 | $0.00 | $0.00 | $220.00 |

In some embodiments, if the customer desires to use the Cosmo Race and Sports Account, the customer could have transferred money there directly from the M account by pre-permissioning and then transferring as above. In some embodiments, the customer could make intra-company transfers without pre-permissioning. So, the customer could have transferred money between the Cosmo accounts without pre-permissioning such transfers. In some embodiments, pre-permissioning of intra-company accounts may be required similar to the inter-company transfers described.

It should be recognized that various examples of embodiments that use pre-permissioning, various forms of pre-permissioning, various restrictions/rules/functionality of pre-permissioning, and/or various other elements of embodiments described herein are non-limiting and may be used in any combination, alternative, or not used at all as desired in various embodiments.

Pass Through Example

Some embodiments may allow money to be transferred in a pass through transaction without a separate request for such a transfer. For example, a request to place a wager from an account when the account does not have enough money to place the wager may act as a request to make a transfer into the account to cover the wager amount. It should be recognized that descriptions of embodiments that may allow such a pass through transferring may apply to embodiments that may not allow such pass through transferring.

Some embodiments may include receiving a request to use an amount of money from an account. Such a request, for example, may include a request to place a wager with the amount of money. Such a request may be received from a device in response to a user action (e.g., a user placing a casino or sports wager).

Some embodiments may include determining that the amount of money is not available in the account. Such a determination may be made by comparing a requested amount to an amount available in an account (e.g., by comparing a database entry regarding the account contents to a received indication of an amount). Some embodiments may include determining an excess amount (i.e., an amount requested that is not available in the account).

Some embodiments may include facilitating a transfer of money from another account into the account in response to a determination that such an amount is not available in the account. Some embodiments may include transferring an excess amount from one or more accounts into the account. In some embodiments one or more accounts that have pre-permissioned amounts available in them may be used as source accounts for such a transfer. In some embodiments a pro-rata amount may be transferred. In some embodiments, a favored account may be transferred from first. In some embodiments, an account with a most amount of pre-permissioned money may be transferred from first. It should be recognized that any manner of determining a distribution of source accounts may be used.

In some embodiments, a transferred amount may be used to fulfill a wager request. In some embodiments, a user may be notified of such a transaction, approval may be requested from a user, and/or such a transaction may occur transparently to a user. In some embodiments, if a request to use funds is made but there are insufficient funds available, in addition to and/or as an alternative to an automatic transferring of funds, a user may be given an option to request such transferring to take place. For example, an indication that pre-permissioned money is available for transferring from other accounts may be shown to a user through a user interface in response to a request to use excess money in an account. In some embodiments, an ordering of the pre-permissioned money may be made based on amount in an account, time that a pre-permissioning has left, a favored account first, alphabetical order, based on a user defined order, and so on.

Transferring Example

FIG. 1 illustrates an example of devices that may be used in some embodiments. It should be recognized that any devices in any combination may be used in various embodiments and that the example of FIG. 1 is given as a non-limiting example. One of more devices may be used to perform or facilitate functionality and/or methods described herein in any combination.

As illustrated in FIG. 1, some embodiments may include an entity responsible for a first account 101. Such an entity may include a server, a program, a computing device, a casino, and so on. Such an entity responsible for a first account may set up an account, receive money to deposit in an account, receive wager for an account, adjust balances of an account, and so on. In some embodiments, an entity responsible for a first account may receive an indication of a pre-permissioned amount, may track pre-permissioned amounts in the account, and so on. In some embodiments, an indication of a pre-permissioned amount may be received by such an entity. Such an indication may be received from a user, from a mobile device, from a computing device, and so on 103. In some embodiments entity 101 may include a casino, a mobile gaming provider, a gaming operator, and so on. In some embodiments, such an entity may use an intermediary for various functionality (e.g., entity 105). Such an intermediary may maintain accounts, provide gaming services to customers of entity 101, facilitate transferring, and so on.

As illustrated in FIG. 1, some embodiments may include a fund transferring agent (e.g., a wallet entity) 105. A fund transferring agent may facilitate transfers of funds from one account to another account. A fund transferring agent may track and/or maintain information about pre-permissioned amounts, available amounts, and so on in one or more accounts. In some embodiments, a fund transferring agent may be the entity that is pre-permissioned to make changes in the first account on behalf of the user at a future time by the indication of the pre-permissioning. A fund transferring agent may maintain a presence at one or more gaming providers and/or otherwise meeting requirements for accessing accounts at one or more gaming providers. In some embodiments, fund transferring agent may be responsible for maintaining all or some accounts (e.g., on behalf of gaming operators, as a gaming operator, and so on).

As illustrated in FIG. 1, some embodiments may include an entity responsible for a second account 107. Such an entity may include a server, a program, a computing device, a casino, and so on. Such an entity responsible for a second account may set up an account, receive money to deposit in an account, receive wager for an account, adjust balances of an account, and so on. Such an entity may receive a request to transfer funds to the second account. Such an entity may transfer that request to the fund transferring entity and/or the entity responsible for the first account. In other embodiments, such an entity may not receive such a request at all. Such requests may be received from a user, from a mobile device, from a computing device, and so on 103. In some embodiments entity 107 may include a part of entity 105. For example entity 105 may act as an intermediary that manages accounts for a casino, a gaming operator, itself, and so on.

In some embodiments, a fund transferring agent may receive an indication of a request to transfer an amount of money to the second account. Such a request may be received from a user, from a mobile device, from a computing device, and so on. Such a request may be received from an entity responsible for the second account. Other embodiments may not include receiving such a request by a fund transferring entity.

Some embodiments may include facilitating a transfer of money from the first account to the second account. For example, a fund transferring agent may request funds from the entity responsible for the first account, may receive funds from that entity, and may give the funds to the entity responsible for the second account. As another example, the fund transferring agent may ask the entity responsible for the first account to transfer the funds to the entity responsible for the second fund, and the entity responsible for the first account may make such a transfer. The entity responsible for the first account, the fund transfer agent, and/or any other entity may determine that the fund transferring agent is pre-permissioned to make and/or request such a transfer on behalf of the user, that the fund transferring agent meets one or more rules of the entity, that enough money is permissioned and/or available, and so on before making such a transfer.

The entity responsible for the second account may receive funds and place the funds in the second account. The user may be notified that such a transfer has been completed by the entity responsible for the second account, the fund transfer agent, and/or any other entity.

In some embodiments, a fund transfer agent may hold no funds. A fund transfer agent may be responsible for the management of fund transfers between customer accounts. A fund transfer agent may keep audit records of requested and executed pre-permission requests.

In some embodiments, an entity responsible for a first account and an entity responsible for a second account may be a same entity (e.g., a same casino maintaining two accounts, a single program maintaining separate accounts). In some embodiments, entities 101, 105, and 107 may be a same entity. For example, a single intermediary may manage, establish, transfer money, and so on for accounts related to multiple gaming operators. Such an intermediary may offer race and sports and/or casino gaming functionality to guests of the gaming operator. In such an embodiment, elements 101 and 107 may be considered functional elements of a system (e.g. modules, database tables, and so on). In such an embodiment, element 105 may be thought of as a module allowing interaction between the other modules.

Communication among and/or between an element of an embodiment may take place through a communication network, the Internet, a bus, an API, a wireless network, a LAN, and so on.

In some embodiments, an entity may provide gaming services (e.g., receive wagers, determine outcomes, provide indications, adjust accounts, provide games, resolve wagers, offer wagers, play games, and so on). For example, entity 101 may offer casino games and/or race and sports wagers to a customer. In some embodiments, entity 105 may make such offerings to customers of each of 101 and 107. Offerings may differ based on accounts being used. Accounts may be used to place wagers on such offerings.

It should be recognized that the example embodiment of FIG. 1 is given as a non-limiting example only and that other embodiments may include any entity or entities performing any desired functionality in any manner.

Example Processes

Figure 2:
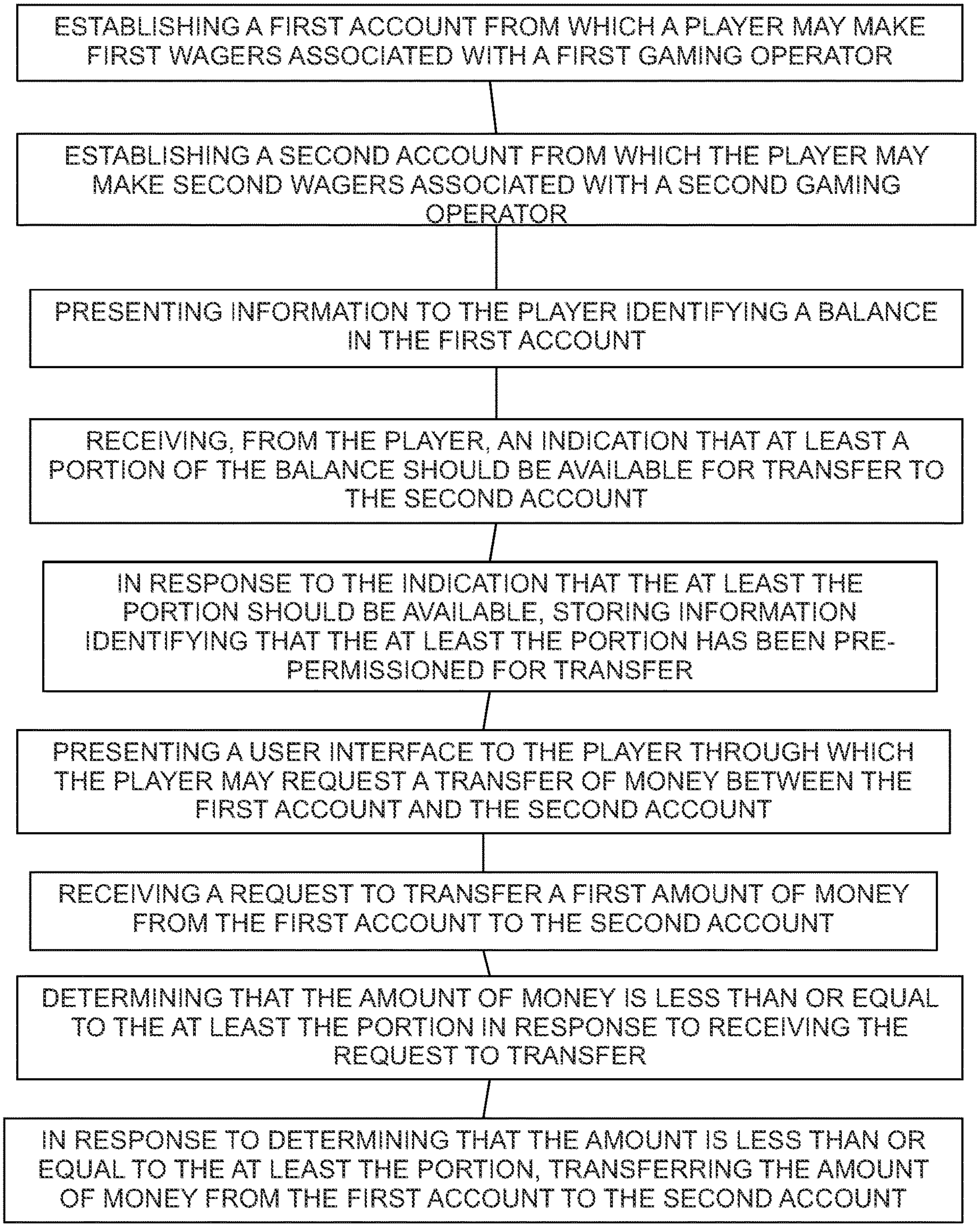
FIG. 2 illustrates an example process that may be performed in some embodiments.

FIG. 2 illustrates an example process that may be performed in some embodiments. Such a process may be performed by one or more computing devices, such as servers, gateways, mobile devices, and so on. Such a method may be embodied on one or more instructions stored in one or more non-transitory medium. In some embodiments, a non-transitory medium having stored thereon a plurality of instructions may cause an apparatus to perform a process when the instructions are executed.

Some embodiments may include establishing a first account from which a player may make first wagers associated with a first gaming operator. In some embodiments, wagers associated with the first gaming operator include at least one of wagers for which the first gaming operator may be due some money (e.g., wagers made using a gaming operator branded application of a mobile device regarding which a mobile gaming provider has agreed to share some fee with the gaming operator), wagers made with the first gaming operator (e.g., wagers between the player and the gaming operator), and wagers that are permitted by the first gaming operator on the first gaming operator's property (e.g., games that the first gaming operator offers or allows on their premises themselves or through some intermediary such as a mobile gaming operator and/or sports book operator).

Some embodiments may include receiving a deposit for the first account and adjusting a balance of the first account to include the deposit. For example, a database may be adjusted to reflect an updated balance based on the deposit. A deposit may include a cash deposit such as at a kiosk, a person, and so on. A deposit may include an electronic deposit such as from an account and/or other source.

Some embodiments may include establishing a second account from which the player may make second wagers associated with a second gaming operator. In some embodiments, the first gaming operator includes a first casino, and the second gaming operator includes a second casino. Making wagers may include placing money at risk for a potential reward in game of chance and/or skill. Some embodiments may include casino games, card games, tournaments, slots, sports betting, and/or any other type of gambling. A gaming operator and/or intermediary (e.g., a mobile gaming provider that operates with a casino to provide mobile gaming, sport books, account transferring services, account maintenance services, and/or other services) may receive information identifying wagers, game action, and so on. Results may be determined and sent back to the player. Balances may be adjusted in response to such outcomes and/or such wagers.

Some embodiments may include presenting information to the player identifying a balance in the first account. For example, a user interface may show a user of a mobile device an amount of money in the account. Such information may be transmitted from a server to a mobile device through a communication network.

Some embodiments may include receiving, from the player, an indication that at least a portion of the balance should be available for transfer to the second account. For example, a player may submit such a request through a user interface of a mobile device, a kiosk, and so on. Such a request may identify time, amounts, gaming operators, and/or any desired characteristics. Such a request may be limited to access through specific logins and/or at specific locations.

Some embodiments may include in response to the indication that the at least the portion should be available, storing information identifying that the at least the portion has been pre-permissioned for transfer. In some embodiments, at least the portion is pre-permissioned for a limited period of time, to specific destination accounts, and so on. Such information may be stored in a database to identify that the amount is pre-permissioned with desired characteristics and is available for future transfers.

Some embodiments may include presenting a user interface to the player through which the player may request a transfer of money between the first account and the second account. Such a request may be limited to specific logins and/or specific locations. Such a request may include a request up to the pre-permissioned amount. Any more may be prevented from being transferred. Excess may be prevented from transfer, but up to the amount may still be transferred if the request is for a greater amount.

Some embodiments may include receiving a request to transfer a first amount of money from the first account to the second account. In some embodiments, the request to transfer includes a wager for an amount that exceeds a balance of the second account at the time of the wager. For example, if a user wagers more money than is in an account, that wager may be interpreted by a system as a request to transfer money into the account to cover the wagered amount. A system in response may transfer the needed money from one or more pre-permissioned accounts with any priority mechanism.

Some embodiments may include determining that the amount of money is less than or equal to the at least the portion in response to receiving the request to transfer. Some embodiments may not include such an action and may transfer as much as possible up to the amount that has been pre-permissioned.

Some embodiments may include in response to determining that the amount is less than or equal to the at least the portion, transferring the amount of money from the first account to the second account. In some embodiments may occur in response to a request for a transfer of money.

Some embodiments may include allowing wagers to be placed using the second account. Such wagers may be placed in relation to a second gaming operator but not a first gaming operator. Such wagers may include wagers related to an authorized set of events.

Some embodiments may include determining outcomes of the wagers and adjusting a balance of the second account in response to the outcomes. For example, a server may receive wagers and/or game actions and determine outcomes for games and/or wagers and adjust the account in response.

Some embodiments may include determining outcomes of a plurality of wagers placed using the first account prior to receiving the request to transfer the first amount and after storing the information identifying that the at least the portion has been pre-permissioned for transfer. The account balance may be adjusted in response to such wagers. In some embodiments, adjusting the balance includes reducing the balance to below the at least the portion. Some embodiments may include in response to adjusting the balance of the first account in response to the outcomes, adjusting the stored information to indicate that only amounts up to the balance have been pre-permissioned, and in which the amount of money is less than or equal to the balance.

Some embodiments may include determining second outcomes of a second plurality of wagers placed using the first account prior to receiving the request to transfer the first amount and adjusting the balance of the first account in response to the outcomes. The account balance may be adjusted in response to such wagers. Adjusting the balance includes increasing the balance to above the at least the portion. Some embodiments may include in response to adjusting the balance of the first account in response to the second outcomes, allowing transfers of amounts of money less than or equal to the at least the portion.

Some embodiments may include establishing a third account from which the player may make third wagers associated with a third gaming operator. In some embodiments, the user interface allows transferring of money from the first account to any of the second and third accounts. In some embodiments, the indication that at least a portion of the balance should be available for transfer identifies that the transfer is only allowed to the second account, and in which the user interface allows transferring of money from the first account to only the second account.

Some embodiments may include determining a first location of the player and based on the first location, allowing wagering using the first account. Some embodiments may include determining a second location of the player and based on the second location, allowing wagering using the second account.

Some embodiments may include determining a first network through which the player accessing a gaming service and based on the first network, allowing wagering using the first account. Some embodiments may include determining a second network through which the player accessing the gaming service and based on the second network, allowing wagering using the second account.

Some embodiments may include determining a first login used by the player to access a gaming service and based on the first login and allowing wagering using the first account. Some embodiments may include determining a second login used by the player to access the gaming service and based on the second login and allowing wagering using the second account.

Some embodiments may include allowing the pre-permissioning from the first account based on the first login, preventing pre-permissioning from the second account based on the first login, and allowing transfers to the second account based on the second login. Accordingly, in such an embodiment, account functionality may be limited based on login. Such functionality may allow an intermediary to provide gaming and/or account services for a plurality of customers (e.g., gaming operators) and to segregate account usage and/or functionality. For example, a player may have a separate login for each gaming operator and based on which login is used, the player may be granted different levels of functionality for different accounts. In some embodiments, a login may be chosen by a user, limited by location, determined by an application used, determined by a gateway accessed, and so on.

Some embodiments may include determining that a third login has been used by the player to access a system, preventing wagering using the first account based on the third login, preventing wagering using the second account based on the third login, and allowing transfers to and pre-permissioning from both the first account and the second account based on the third login. Accordingly, in some embodiments, a single login may allow a user to control functionality related to multiple accounts. Such a login may have limited functionality for wagering but allow other functionality. Accordingly, a single login may allow a user to pre-permission and transfer money without having to switch logins. In some embodiments, such a single sign in may include wagering functionality at one or more of the gaming operators.

It should be recognized that FIG. 2 is illustrated and discussed as a non-limiting example only and that various embodiments may include part, none, all, alternative, differently ordered, alternative, and so on actions and/or processes.

Figure 3:
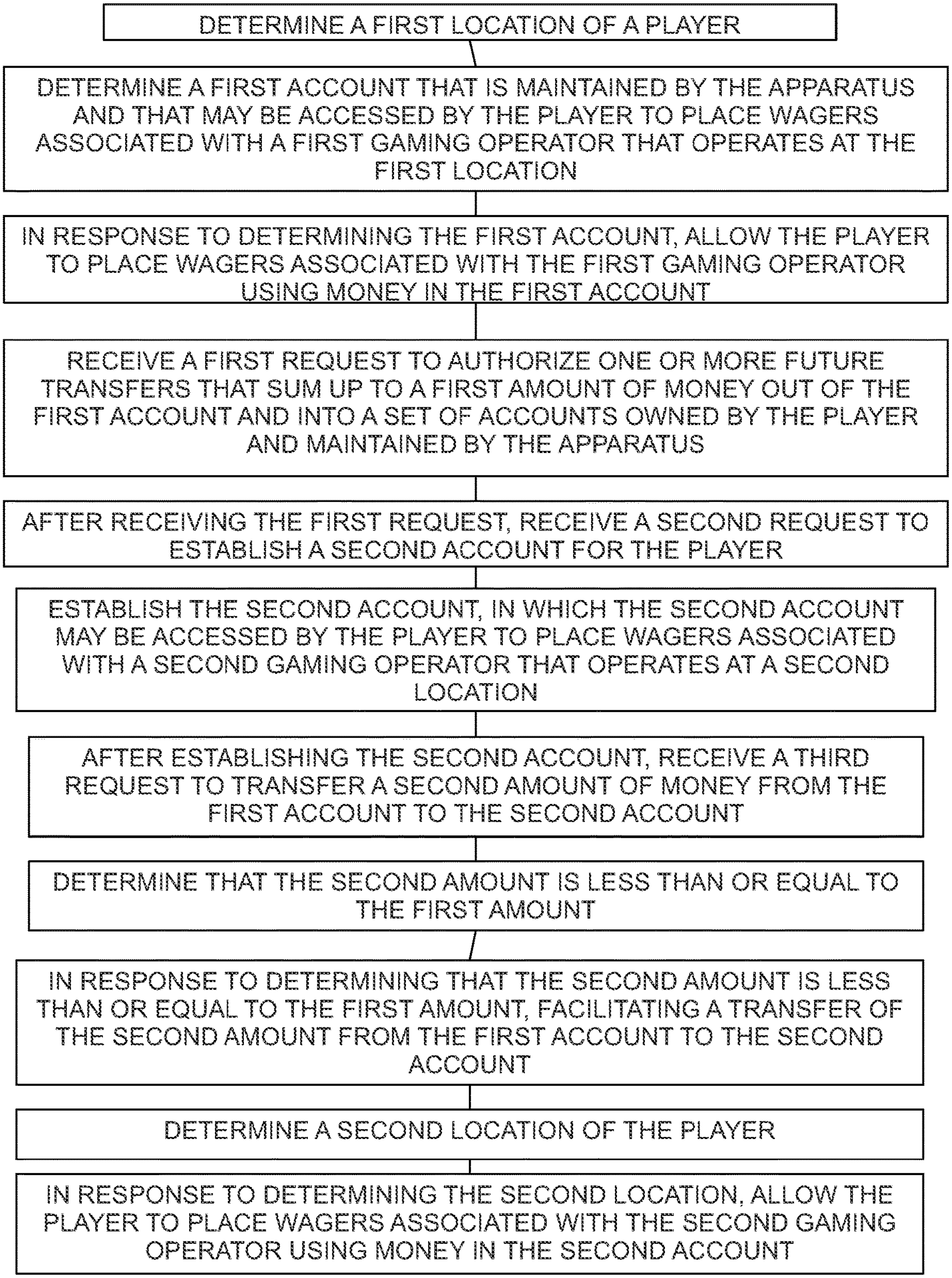
FIG. 3 illustrates an example process that may be performed in some embodiments.

FIG. 3 illustrates an example process that may be performed in some embodiments. Such a process may be performed by one or more computing devices, such as servers, gateways, mobile devices, and so on. Such a method may be embodied on one or more instructions stored in one or more non-transitory medium. In some embodiments, a non-transitory medium having stored thereon a plurality of instructions may cause an apparatus to perform a process when the instructions are executed.

Some embodiments may include determining a first location of a player. In some embodiments, the location is determined based on at least one of a network used to access a gaming service by the player, an IP address of a device used by the player, a geofence in which the player is located, a GPS location of the player, and a login used by the player to access the gaming service.

Some embodiments may include determining a first account that is maintained by the apparatus and that may be accessed by the player to place wagers associated with a first gaming operator that operates at the first location. For example, a mobile gaming, sports book, and/or accounting system may determine that based on being located at a casino, using an application branded to the casino, using a network of the casino, using a login associated with the casino, and so on that the user may place wagers from a particular account. Such wagers may be placed against the first gaming operator, against some other party (e.g., mobile gaming operator, sports book, other player).

Some embodiments may include in response to determining the first account, allowing the player to place wagers associated with the first gaming operator using money in the first account.

Some embodiments may include receiving a first request to authorize one or more future transfers that sum up to a first amount of money out of the first account and into a set of accounts owned by the player and maintained by the apparatus.

Some embodiments may include, after receiving the first request, receiving a second request to establish a second account for the player.

Some embodiments may include establishing the second account, in which the second account may be accessed by the player to place wagers associated with a second gaming operator that operates at a second location. In some embodiments, the second account cannot be used to place wagers associated with the first gaming operator, in which the second location is different from the first location. In some embodiments, the first account cannot be used to place wagers associated with the second gaming operator. In some embodiments, the first account includes a casino wagering account, and the second account includes a race and sports betting account.

Some embodiments may include, after establishing the second account, receiving a third request to transfer a second amount of money from the first account to the second account.

Some embodiments may include determining that the second amount is less than or equal to the first amount.

Some embodiments may include in response to determining that the second amount is less than or equal to the first amount, facilitating a transfer of the second amount from the first account to the second account. In some embodiments, such a transfer may occur in response to a request up to a pre-permissioned amount.

Some embodiments may include determining a second location of the player. Some embodiments may include in response to determining the second location, allowing the player to place wagers associated with the second gaming operator using money in the second account.

Some embodiments may include associating the first and second accounts with the player through a database that maintains information about the player. For example, a customer database may store information about players and associate accounts and information about the player across accounts.

Some embodiments may include receiving a change to player information from a first gaming operator and adjust the maintained information so that information about the player is consistent across gaming operators. In some embodiments, the information includes at least one of: an address of the player, a driver's license number of the player, a social security number of the player, and a name of the player. For example, a player may establish a new account with a new gaming operator and identify a new form of ID (e.g., driver's license). Such new form of ID may be recorded for the player in a database along with prior information about the player (e.g., a social security number).

Some embodiments may include allowing the transfer based on the second location being associated with the second gaming operator. In some embodiments, location may be irrelevant. Some embodiments may include login, network, device, application and so on in addition to and/or as an alternative or proxy to location.

Some embodiments may include reducing the first amount by the second amount and allow further transfers up to the reduced first amount. Accordingly, an amount pre-permissioned may be lowered as amounts are transferred.

It should be recognized that FIG. 3 is illustrated and discussed as a non-limiting example only and that various embodiments may include part, none, all, alternative, differently ordered, alternative, and so on actions and/or processes. It should be recognized that features discussed with respect to any figure and/or embodiment may be used together in any combination with other embodiments and/or features. For example, one or more features of FIG. 2 and FIG. 3 may be used together with one or more features of a system of FIG. 1 in some embodiments.

Further Examples

Some embodiments may include facilitating a linking account to which money from one account may be transferred and from which money may be transferred into another account. Such a linking account may be maintained by one or more casinos, and/or a trusted third party. Such a linking account may allow a user of a casino account to transfer gaming related funds from one casino account to the linking account, and into another casino account for gamin at the other casino.

In some embodiments, a single account may be used across a plurality of casinos. Such a single account may act as an account in each of the plurality of casinos. For example, winnings may pass through an account at a particular casino into the single account. Wagers may be transferred from the single account into the casino account and then placed on the game. Such passing through may occur transparently to a user. Such a passing through may occur in response to a winning, in response to a wager, in response to a submission of money into an account.

Auditing of each transaction into and out of a linking and/or single account may be facilitated by recording each transaction for each account and each wager and each outcome.

Transactions through a pass through embodiment may occur according to an agreement between each casino and a linking account operator. Such agreement may include a formation of an API that allows direct pass through fund transfers. In some embodiments, a pass through may include a delay in a casino account for a period of time for processing., In some embodiments a linking and/or single account may be used in combination with separate accounts (e.g., a user may place bets and/or store money in both a single casino account and a linking and/or single account simultaneously).

A user with such an account may use a mobile gaming device (e.g., an android phone) to place wagers at each of a plurality of casinos with or without opening new accounts at each casino. For example, in some embodiments, opening a linking and/or single account may operate to open separate accounts at each casino that may act as a pass through, and/or recipient for funds. In some embodiments, the use may directly use the funds in the single account to wager.

PROCESSES AND/OR APPARATUS

I. Terms

The term "product" means any machine, manufacture and/or composition of matter, unless expressly specified otherwise.

The term "process" means any process, algorithm, method, or the like, unless expressly specified otherwise.

Each process (whether called a method, algorithm or otherwise) inherently includes one or more steps, and therefore all references to a "step" or "steps" of a process have an inherent antecedent basis in the mere recitation of the term 'process' or a like term. Accordingly, any reference in a claim to a 'step' or 'steps' of a process has sufficient antecedent basis.

The term "invention" and the like mean "the one or more inventions disclosed in this application", unless expressly specified otherwise.

The terms "an embodiment", "embodiment", "embodiments", "the embodiment", "the embodiments", "one or more embodiments", "some embodiments", "certain embodiments", "one embodiment", "another embodiment" and the like mean "one or more (but not all) embodiments of the disclosed invention(s)", unless expressly specified otherwise.

The term "variation" of an invention means an embodiment of the invention, unless expressly specified otherwise.

A reference to "another embodiment" in describing an embodiment does not imply that the referenced embodiment is mutually exclusive with another embodiment (e.g., an embodiment described before the referenced embodiment), unless expressly specified otherwise.

The terms "including", "comprising" and variations thereof mean "including but not necessarily limited to", unless expressly specified otherwise. Thus, for example, the sentence "the portfolio includes a red widget and a blue widget" means the portfolio includes the red widget and the blue widget but may include something else.

The term "consisting of" and variations thereof means "including and limited to", unless expressly specified otherwise. Thus, for example, the sentence "the portfolio consists of a red widget and a blue widget" means the portfolio includes the red widget and the blue widget but does not include anything else.

The term "compose" and variations thereof means "to make up the constituent parts of, component of, or member of", unless expressly specified otherwise. Thus, for example, the sentence "the red widget and the blue widget compose a portfolio" means the portfolio includes the red widget and the blue widget.

The term "exclusively compose" and variations thereof means "to make up exclusively the constituent parts of, to be the only components of or to be the only members of", unless expressly specified otherwise. Thus, for example, the sentence "the red widget and the blue widget exclusively compose a portfolio" means the portfolio consists of the red widget and the blue widget, and nothing else.

The terms "a", "an" and "the" mean "one or more", unless expressly specified otherwise.

The term "plurality" means "two or more", unless expressly specified otherwise.

The term "herein" means "in the present application, including anything which may be incorporated by reference", unless expressly specified otherwise.

The phrase "at least one of", when such phrase modifies a plurality of things (such as an enumerated list of things) means any combination of one or more of those things, unless expressly specified otherwise. For example, the phrase "at least one of a widget, a car and a wheel" means either (i) a widget, (ii) a car, (iii) a wheel, (iv) a widget and a car, (v) a widget and a wheel, (vi) a car and a wheel, or (vii) a widget, a car, and a wheel. The phrase "at least one of", when such phrase modifies a plurality of things does not mean "one of each of" the plurality of things.

Numerical terms such as "one", "two", etc. when used as cardinal numbers to indicate quantity of something (e.g., one widget, two widgets), mean the quantity indicated by that numerical term, but do not mean at least the quantity indicated by that numerical term. For example, the phrase "one widget" does not mean "at least one widget", and therefore the phrase "one widget" does not cover, e.g., two widgets.

The phrase "based on" does not mean "based only on", unless expressly specified otherwise. In other words, the phrase "based on" describes both "based only on" and "based at least on". The phrase "based at least on" is equivalent to the phrase "based at least in part on".

The term "represent" and like terms are not exclusive, unless expressly specified otherwise. For example, the term "represents" does not mean "represents only", unless expressly specified otherwise. In other words, the phrase "the data represents a credit card number" describes both "the data represents only a credit card number" and "the data represents a credit card number, and the data also represents something else".

The term "whereby" is used herein only to precede a clause or other set of words that express only the intended result, objective, or consequence of something that is previously and explicitly recited. Thus, when the term "whereby" is used in a claim, the clause, or other words that the term "whereby" modifies do not establish specific further limitations of the claim or otherwise restricts the meaning or scope of the claim.

The term "e.g." and like terms mean "for example", and thus does not limit the term or phrase it explains. For example, in the sentence "the computer sends data (e.g., instructions, a data structure) over the Internet", the term "e.g." explains that "instructions" are an example of "data" that the computer may send over the Internet, and also explains that "a data structure" is an example of "data" that the computer may send over the Internet. However, both "instructions" and "a data structure" are merely examples of "data", and other things besides "instructions" and "a data structure" can be "data".

The term "respective" and like terms mean "taken individually". Thus if two or more things have "respective" characteristics, then each such thing has its own characteristic, and these characteristics can be different from each other but need not be. For example, the phrase "each of two machines has a respective function" means that the first such machine has a function and the second such machine has a function as well. The function of the first machine may or may not be the same as the function of the second machine.

The term "i.e." and like terms mean "that is", and thus limits the term or phrase it explains. For example, in the sentence "the computer sends data (i.e., instructions) over the Internet", the term "i.e." explains that "instructions" are the "data" that the computer sends over the Internet.

Any given numerical range shall include whole and fractions of numbers within the range. For example, the range "1 to 10" shall be interpreted to specifically include whole numbers between 1 and 10 (e.g., 1, 2, 3, 4, . . . 9) and non-whole numbers (e.g., 1.1, 1.2, . . . 1.9).

Where two or more terms or phrases are synonymous (e.g., because of an explicit statement that the terms or phrases are synonymous), instances of one such term/phrase does not mean instances of another such term/phrase must have a different meaning. For example, where a statement renders the meaning of "including" to be synonymous with "including but not limited to", the mere usage of the phrase "including but not limited to" does not mean that the term "including" means something other than "including but not limited to".

II. Determining

The term "determining" and grammatical variants thereof (e.g., to determine a price, determining a value, determine an object which meets a certain criterion) is used in an extremely broad sense. The term "determining" encompasses a wide variety of actions and therefore "determining" can include calculating, computing, processing, deriving, investigating, looking up (e.g., looking up in a table, a database, or another data structure), ascertaining and the like. Also, "determining" can include receiving (e.g., receiving information), accessing (e.g., accessing data in a memory) and the like. Also, "determining" can include resolving, selecting, choosing, establishing, and the like.

The term "determining" does not imply certainty or absolute precision, and therefore "determining" can include estimating, extrapolating, predicting, guessing and the like.

The term "determining" does not imply that mathematical processing must be performed and does not imply that numerical methods must be used and does not imply that an algorithm or process is used.

The term "determining" does not imply that any particular device must be used. For example, a computer need not necessarily perform the determining.

III. Forms of Sentences

Where a limitation of a first claim would cover one of a feature as well as more than one of a feature (e.g., a limitation such as "at least one widget" covers one widget as well as more than one widget), and where in a second claim that depends on the first claim, the second claim uses a definite article "the" to refer to the limitation (e.g., "the widget"), this does not imply that the first claim covers only one of the feature, and this does not imply that the second claim covers only one of the feature (e.g., "the widget" can cover both one widget and more than one widget).

When an ordinal number (such as "first", "second", "third" and so on) is used as an adjective before a term, that ordinal number is used (unless expressly specified otherwise) merely to indicate a particular feature, such as to distinguish that particular feature from another feature that is described by the same term or by a similar term. For example, a "first widget" may be so named merely to distinguish it from, e.g., a "second widget". Thus, the mere usage of the ordinal numbers "first" and "second" before the term "widget" does not indicate any other relationship between the two widgets, and likewise does not indicate any other characteristics of either or both widgets. For example, the mere usage of the ordinal numbers "first" and "second" before the term "widget" (1) does not indicate that either widget comes before or after any other in order or location; (2) does not indicate that either widget occurs or acts before or after any other in time; and (3) does not indicate that either widget ranks above or below any other, as in importance or quality. In addition, the mere usage of ordinal numbers does not define a numerical limit to the features identified with the ordinal numbers. For example, the mere usage of the ordinal numbers "first" and "second" before the term "widget" does not indicate that there must be no more than two widgets.

When a single device, article or other product is described herein, more than one device/article (whether or not they cooperate) may alternatively be used in place of the single device/article that is described. Accordingly, the functionality that is described as being possessed by a device may alternatively be possessed by more than one device/article (whether or not they cooperate).

Similarly, where more than one device, article or other product is described herein (whether or not they cooperate), a single device/article may alternatively be used in place of the more than one device or article that is described. For example, a plurality of computer-based devices may be substituted with a single computer-based device. Accordingly, the various functionality that is described as being possessed by more than one device or article may alternatively be possessed by a single device/article.

The functionality and/or the features of a single device that is described may be alternatively embodied by one or more other devices which are described but are not explicitly described as having such functionality/features. Thus, other embodiments need not include the described device itself, but rather can include the one or more other devices which would, in those other embodiments, have such functionality/features.

IV. Disclosed Examples and Terminology are Not Limiting

Neither the Title (set forth at the beginning of the first page of the present application) nor the Abstract (set forth at the end of the present application) is to be taken as limiting in any way as the scope of the disclosed invention(s), is to be used in interpreting the meaning of any claim or is to be used in limiting the scope of any claim. An Abstract has been included in this application merely because an Abstract is required under 37 C.F.R. § 1.72 (b).

The title of the present application and headings of sections provided in the present application are for convenience only and are not to be taken as limiting the disclosure in any way.

Numerous embodiments are described in the present application and are presented for illustrative purposes only. The described embodiments are not, and are not intended to be, limiting in any sense. The presently disclosed invention (s) are widely applicable to numerous embodiments, as is readily apparent from the disclosure. One of ordinary skill in the art will recognize that the disclosed invention(s) may be practiced with various modifications and alterations, such as structural, logical, software, and electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

Though an embodiment may be disclosed as including several features, other embodiments of the invention may include fewer than all such features. Thus, for example, a claim may be directed to less than the entire set of features in a disclosed embodiment, and such claim would not include features beyond those features that the claim expressly recites.

No embodiment of method steps or product elements described in the present application constitutes the invention claimed herein, or is essential to the invention claimed herein, or is coextensive with the invention claimed herein, except where it is either expressly stated to be so in this specification or expressly recited in a claim.

The preambles of the claims that follow recite purposes, benefits, and possible uses of the claimed invention only and do not limit the claimed invention.

The present disclosure is not a literal description of all embodiments of the invention(s). Also, the present disclosure is not a listing of features of the invention(s) which must be present in all embodiments.

All disclosed embodiments are not necessarily covered by the claims (even including all pending, amended, issued, and canceled claims). In addition, an embodiment may be (but need not necessarily be) covered by several claims. Accordingly, where a claim (regardless of whether pending, amended, issued, or canceled) is directed to a particular embodiment, such is not evidence that the scope of other claims do not also cover that embodiment.

Devices that are described as in communication with each other need not be in continuous communication with each other, unless expressly specified otherwise. On the contrary, such devices need only transmit to each other as necessary or desirable and may actually refrain from exchanging data most of the time. For example, a machine in communication with another machine via the Internet may not transmit data to the other machine for long period of time (e.g. weeks at a time). In addition, devices that are in communication with each other may communicate directly or indirectly through one or more intermediaries.

A description of an embodiment with several components or features does not imply that all or even any of such components/features are required. On the contrary, a variety of optional components are described to illustrate the wide variety of possible embodiments of the present invention(s). Unless otherwise specified explicitly, no component/feature is essential or required.

Although process steps, algorithms or the like may be described or claimed in a particular sequential order, such processes may be configured to work in different orders. In other words, any sequence or order of steps that may be explicitly described or claimed does not necessarily indicate a requirement that the steps be performed in that order. The steps of processes described herein may be performed in any order possible. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention(s), and does not imply that the illustrated process is preferred.

Although a process may be described as including a plurality of steps, that does not imply that all or any of the steps are preferred, essential or required. Various other embodiments within the scope of the described invention(s) include other processes that omit some or all of the described steps. Unless otherwise specified explicitly, no step is essential or required.

Although a process may be described singly or without reference to other products or methods, in an embodiment the process may interact with other products or methods. For example, such interaction may include linking one business model to another business model. Such interaction may be provided to enhance the flexibility or desirability of the process.

Although a product may be described as including a plurality of components, aspects, qualities, characteristics and/or features, that does not indicate that any or all of the plurality are preferred, essential or required. Various other embodiments within the scope of the described invention(s) include other products that omit some or all of the described plurality.

An enumerated list of items (which may or may not be numbered) does not imply that any or all of the items are mutually exclusive, unless expressly specified otherwise. Likewise, an enumerated list of items (which may or may not be numbered) does not imply that any or all of the items are comprehensive of any category, unless expressly specified otherwise. For example, the enumerated list "a computer, a laptop, a PDA" does not imply that any or all of the three items of that list are mutually exclusive and does not imply that any or all of the three items of that list are comprehensive of any category.

An enumerated list of items (which may or may not be numbered) does not imply that any or all of the items are equivalent to each other or readily substituted for each other.

All embodiments are illustrative, and do not imply that the invention or any embodiments were made or performed, as the case may be.

V. Computing

It will be readily apparent to one of ordinary skill in the art that the various processes described herein may be implemented by, e.g., appropriately programmed general purpose computers, special purpose computers and computing devices. Typically a processor (e.g., one or more microprocessors, one or more microcontrollers, one or more digital signal processors) will receive instructions (e.g., from a memory or like device), and execute those instructions, thereby performing one or more processes defined by those instructions. Instructions may be embodied in, e.g., one or more computer programs, one or more scripts.

A "processor" means one or more microprocessors, central processing units (CPUs), computing devices, microcontrollers, digital signal processors, or like devices or any combination thereof, regardless of the architecture (e.g., chip-level multiprocessing/multi-core, RISC, CISC, Microprocessor without Interlocked Pipeline Stages, pipelining configuration, simultaneous multithreading).

Thus a description of a process is likewise a description of an apparatus for performing the process. The apparatus that performs the process can include, e.g., a processor and those input devices and output devices that are appropriate to perform the process.

Further, programs that implement such methods (as well as other types of data) may be stored and transmitted using a variety of media (e.g., computer readable media) in a number of manners. In some embodiments, hard-wired circuitry or custom hardware may be used in place of, or in combination with, some or all of the software instructions that can implement the processes of various embodiments. Thus, various combinations of hardware and software may be used instead of software only.

The term "computer-readable medium" refers to any medium, a plurality of the same, or a combination of different media, that participate in providing data (e.g., instructions, data structures) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory (DRAM), which typically constitutes the main memory. Transmission media include coaxial cables, copper wire and fiber optics, including the wires that comprise a system bus coupled to the processor. Transmission media may include or convey acoustic waves, light waves, and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Various forms of computer readable media may be involved in carrying data (e.g. sequences of instructions) to a processor. For example, data may be (i) delivered from RAM to a processor; (ii) carried over a wireless transmission medium; (iii) formatted and/or transmitted according to numerous formats, standards or protocols, such as Ethernet (or IEEE 802.3), SAP, ATP, Bluetooth, and TCP/IP, TDMA, CDMA, and 3G; and/or (iv) encrypted to ensure privacy or prevent fraud in any of a variety of ways well known in the art.

Thus a description of a process is likewise a description of a computer-readable medium storing a program for performing the process. The computer-readable medium can store (in any appropriate format) those program elements which are appropriate to perform the method.

Just as the description of various steps in a process does not indicate that all the described steps are required, embodiments of an apparatus include a computer/computing device operable to perform some (but not necessarily all) of the described process.

Likewise, just as the description of various steps in a process does not indicate that all the described steps are required, embodiments of a computer-readable medium storing a program or data structure include a computer-readable medium storing a program that, when executed, can cause a processor to perform some (but not necessarily all) of the described process.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models and/or distributed databases) could be used to store and manipulate the data types described herein. Likewise, object methods or behaviors of a database can be used to implement various processes, such as the described herein. In addition, the databases may, in a known manner, be stored locally or remotely from a device which accesses data in such a database.

Various embodiments can be configured to work in a network environment including a computer that is in communication (e.g., via a communications network) with one or more devices. The computer may communicate with the devices directly or indirectly, via any wired or wireless medium (e.g. the Internet, LAN, WAN or Ethernet, Token Ring, a telephone line, a cable line, a radio channel, an optical communications line, commercial on-line service providers, bulletin board systems, a satellite communications link, a combination of any of the above). Each of the devices may themselves comprise computers or other computing devices, such as those based on the Intel® Pentium® or Centrino™ processor, that are adapted to communicate with the computer. Any number and type of devices may be in communication with the computer.

In an embodiment, a server computer or centralized authority may not be necessary or desirable. For example, the present invention may, in an embodiment, be practiced on one or more devices without a central authority. In such an embodiment, any functions described herein as performed by the server computer or data described as stored on the server computer may instead be performed by or stored on one or more such devices.

Where a process is described, in an embodiment the process may operate without any user intervention. In another embodiment, the process includes some human intervention (e.g., a step is performed by or with the assistance of a human).

VI. Continuing Applications

The present disclosure provides, to one of ordinary skill in the art, an enabling description of several embodiments and/or inventions. Some of these embodiments and/or inventions may not be claimed in the present application but may nevertheless be claimed in one or more continuing applications that claim the benefit of priority of the present application.

Applicants intend to file additional applications to pursue patents for subject matter that has been disclosed and enabled but not claimed in the present application.

VII. 35 U.S.C. § 112, Paragraph 6

In a claim, a limitation of the claim which includes the phrase "means for" or the phrase "step for" means that 35 U.S.C. § 112, paragraph 6, applies to that limitation.

In a claim, a limitation of the claim which does not include the phrase "means for" or the phrase "step for" means that 35 U.S.C. § 112, paragraph 6 does not apply to that limitation, regardless of whether that limitation recites a function without recitation of structure, material or acts for performing that function. For example, in a claim, the mere use of the phrase "step of" or the phrase "steps of" in referring to one or more steps of the claim or of another claim does not mean that 35 U.S.C. § 112, paragraph 6, applies to that step(s).

With respect to a means or a step for performing a specified function in accordance with 35 U.S.C. § 112, paragraph 6, the corresponding structure, material, or acts described in the specification, and equivalents thereof, may perform additional functions as well as the specified function.

Computers, processors, computing devices and like products are structures that can perform a wide variety of functions. Such products can be operable to perform a specified function by executing one or more programs, such as a program stored in a memory device of that product or in a memory device which that product accesses. Unless expressly specified otherwise, such a program need not be based on any particular algorithm, such as any particular algorithm that might be disclosed in the present application. It is well known to one of ordinary skill in the art that a specified function may be implemented via different algorithms, and any of a number of different algorithms would be a mere design choice for carrying out the specified function.

Therefore, with respect to a means or a step for performing a specified function in accordance with 35 U.S.C. § 112, paragraph 6, structure corresponding to a specified function includes any product programmed to perform the specified function. Such structure includes programmed products which perform the function, regardless of whether such product is programmed with (i) a disclosed algorithm for performing the function, (ii) an algorithm that is similar to a disclosed algorithm, or (iii) a different algorithm for performing the function.

Where there is recited a means for performing a function that is a method, one structure for performing this method includes a computing device (e.g., a general purpose computer) that is programmed and/or configured with appropriate hardware to perform that function.

Also included is a computing device (e.g., a general purpose computer) that is programmed and/or configured with appropriate hardware to perform that function via other algorithms as would be understood by one of ordinary skill in the art.

VIII. Disclaimer

Numerous references to a particular embodiment do not indicate a disclaimer or disavowal of additional, different embodiments, and similarly references to the description of embodiments which all include a particular feature do not indicate a disclaimer or disavowal of embodiments which do not include that particular feature. A clear disclaimer or disavowal in the present application shall be prefaced by the phrase "does not include" or by the phrase "cannot perform".

IX. Incorporation by Reference

Any patent, patent application or other document referred to herein is incorporated by reference into this patent application as part of the present disclosure, but only for purposes of written description and enablement in accordance with 35 U.S.C. § 112, paragraph 1, and should in no way be used to limit, define, or otherwise construe any term of the present application, unless without such incorporation by reference, no ordinary meaning would have been ascertainable by a person of ordinary skill in the art. Such person of ordinary skill in the art need not have been in any way limited by any embodiments provided in the reference.

Any incorporation by reference does not, in and of itself, imply any endorsement of, ratification of, or acquiescence in any statements, opinions, arguments or characterizations contained in any incorporated patent, patent application or other document, unless explicitly specified otherwise in this patent application.

X. Prosecution History

In interpreting the present application (which includes the claims), one of ordinary skill in the art shall refer to the prosecution history of the present application, but not to the prosecution history of any other patent or patent application, regardless of whether there are other patent applications that are considered related to the present application, and regardless of whether there are other patent applications that share a claim of priority with the present application.

Further Embodiments

The following should be interpreted as further example embodiments and not as claims.

A method comprising: establishing a first account from which a player may make first wagers associated with a first gaming operator; establishing a second account from which the player may make second wagers associated with a second gaming operator; presenting information to the player identifying a balance in the first account; receiving, from the player, an indication that at least a portion of the balance should be available for transfer to the second account; in response to the indication that the at least the portion should be available, storing information identifying that the at least the portion has been pre-permissioned for transfer; presenting a user interface to the player through which the player may request a transfer of money between the first account and the second account; receiving a request to transfer a first amount of money from the first account to the second account; determining that the amount of money is less than or equal to the at least the portion in response to receiving the request to transfer; in response to determining that the amount is less than or equal to the at least the portion, transferring the amount of money from the first account to the second account.

A.1. The method of claim A, in which wagers associated with the first gaming operator include at least one of wagers for which the first gaming operator may be due some money, wagers made with the first gaming operator, and wagers that are permitted by the first gaming operator on the first gaming operator's property. A.2. The method of claim A, comprising: receiving a deposit for the first account and adjusting a balance of the first account to include the deposit. A.3. The method of claim A, comprising allowing wagers to be placed using the second account. A.3.1. The method of claim A.3, comprising: determining outcomes of the wagers and adjusting a balance of the second account in response to the outcomes.

A.4. The method of claim A, comprising: determining outcomes of a plurality of wagers placed using the first account prior to receiving the request to transfer the first amount and after storing the information identifying that the at least the portion has been pre-permissioned for transfer; adjusting a balance of the first account in response to the outcomes, in which adjusting the balance includes reducing the balance to below the at least the portion. A.4.1. The method of claim A.4, comprising: in response to adjusting the balance of the first account in response to the outcomes, adjusting the stored information to indicate that only amounts up to the balance have been pre-permissioned, and in which the amount of money is less than or equal to the balance. A.4.2. The method of claim A.4, comprising: determining second outcomes of a second plurality of wagers placed using the first account prior to receiving the request to transfer the first amount and adjusting the balance of the first account in response to the outcomes; adjusting the balance of the first account in response to the second outcomes, in which adjusting the balance includes increasing the balance to above the at least the portion. A.4.2.1. The method of claim A.4.2, comprising: in response to adjusting the balance of the first account in response to the second outcomes, allowing transfers of amounts of money less than or equal to the at least the portion.

A.5. The method of claim A, in which the at least the portion is pre-permissioned for a limited period of time. A.6. The method of claim A, comprising: establishing a third account from which the player may make third wagers associated with a third gaming operator. A.6.1. The method of claim A.6, in which the user interface allows transferring of money from the first account to any of the second and third accounts. A.6.2. The method of claim A.6, in which the indication that at least a portion of the balance should be available for transfer identifies that the transfer is only allowed to the second account, and in which the user interface allows transferring of money from the first account to only the second account. A.7. The method of claim A, in which the first gaming operator includes a first casino and in which the second gaming operator includes a second casino. A.8. The method of claim A, in which the request to transfer includes a wager for an amount that exceeds a balance of the second account at the time of the wager. A.9. The method of claim A, comprising: determining a first location of the player and based on the first location, allowing wagering using the first account; and determining a second location of the player and based on the second location, allowing wagering using the second account.

A.10. The method of claim A, comprising: determining a first network through which the player accessing a gaming service and based on the first network, allowing wagering using the first account; and determining a second network through which the player accessing the gaming service and based on the second network, allowing wagering using the second account. A.11. The method of claim A, comprising: determining a first login used by the player to access a gaming service and based on the first login, allowing wagering using the first account; and determining a second login used by the player to access the gaming service and based on the second login, allowing wagering using the second account. A.10.1. The method of claim A.10, comprising: allowing the pre-permissioning from the first account based on the first login; preventing pre-permissioning from the second account based on the first login; and allowing transfers to the second account based on the second login. A.10.2. The method of claim A.10, comprising: determining that a third login has been used by the player to access a system; preventing wagering using the first account based on the third login; preventing wagering using the second account based on the third login; and allowing transfers to and pre-permissioning from both the first account and the second account based on the third login.

B. An apparatus comprising: a computing device; and a non-transitory medium having stored thereon a plurality of instructions that when executed by the computing device cause the apparatus to: determine a location of a player; determine a first account that is maintained by the apparatus and that may be accessed by the player to place wagers associated with a first gaming operator that operates at the first location; in response to determining the first account, allow the player to place wagers associated with the first gaming operator using money in the first account; receive a first request to authorize one or more future transfers that sum up to a first amount of money out of the first account and into a set of accounts owned by the player and maintained by the apparatus; after receiving the first request, receive a second request to establish a second account for the player; establish the second account, in which the second account may be accessed by the player to place wagers associated with a second gaming operator that operates at a second location; after establishing the second account, receive a third request to transfer a second amount of money from the first account to the second account; determine that the second amount is less than or equal to the first amount; in response to determining that the second amount is less than or equal to the first amount, facilitating a transfer of the second amount from the first account to the second account; determine a second location of the player; in response to determining the second location, allow the player to place wagers associated with the second gaming operator using money in the second account.

B.1. The apparatus of claim B, in which the location is determined based on at least one of a network used to access the a gaming service by the player, a IP address of a device used by the player, a geofence in which the player is located, a GPS location of the player, and a login used by the player to access the gaming service. B.2. The apparatus of claim B, in which the second account cannot be used to place wagers associated with the first gaming operator, in which the second location is different from the first location. B.2.1. The apparatus of claim B.2. in which the first account cannot be used to place wagers associated with the second gaming operator. B.3. The apparatus of claim B, in which the plurality of instructions cause the apparatus to: associate the first and second accounts with the player through a database that maintains information about the player. B.3.1. The apparatus of claim B.3, in which the plurality of instructions cause the apparatus to: receive a change to player information from a first gaming operator and adjust the maintained information so that information about the player is consistent across gaming operators. B.3.1.1. The apparatus of claim B.3.1, in which the information includes at least one of: an address of the player, a driver's license number of the player, a social security number of the player, and a name of the player.

B.4. The apparatus of claim B, in which the plurality of instructions cause the apparatus to: allow the transfer based on the second location being associated with the second gaming operator. B.5. The apparatus of claim B, in which the plurality of instructions cause the apparatus to: reduce the first amount by the second amount and allow further transfers up to the reduced first amount. B.6. The apparatus of claim B, in which the first account includes a casino wagering account, and the second account includes a race and sports betting account.

The invention claimed is:

1. A system comprising:

one or more server computers, each of the one or more server computers including at least one processor, the one or more server computers being configured to:

receive login information of a user from a mobile gambling application being executed on a smartphone, wherein the login information enables access to a user account established with a gaming operator of the mobile gambling application;

attempt to verify the login information;

based at least on successful verification of the login information, provide the user access to the user account via the mobile gambling application;

receive at least Global Positioning System (GPS) data from the smartphone while the smartphone executes the mobile gambling application;

based at least on the GPS data, determine whether the user is in a location where wagering is permitted;

based at least on a determination that the user is in the location where wagering is permitted:

receive, from the mobile gambling application, a request to transfer money from a pre-permissioned financial account of the user to the user account, wherein the pre-permissioned financial account is associated with a financial institution;

determine that an amount of the money is less than a maximum transfer amount designated for the location where wagering is permitted;

while a current location of the user continues to be determined as the location where wagering is permitted and the determination that the amount of the money is less than the maximum transfer amount, approve the request; and based at least on a determination that the user is in a location where wagering is not permitted, deny the first request.

2. The system of claim 1, wherein the one or more server computers are further configured to receive at least one of:

an Internet Protocol (IP) address;

an identifier of a network that the smartphone is connected to;

an identifier of a geofence in which the smartphone is located; or triangulation data; and wherein to determine whether the user is in the location where wagering is not permitted, the one or more server computers are configured to determine whether the user is in the location where wagering is not permitted based on at least the GPS data and one or more of the IP address, the identifier of the network that the smartphone is connected to, the identifier of the geofence in which the smartphone is located, or the triangulation data.

3. The system of claim 1, wherein the location where wagering is permitted is a geofenced area at a casino property.

4. The system of claim 1, wherein the one or more server computers are further configured to:

receive, from the mobile gambling application, a second request to transfer money from the pre-permissioned financial account of the user to the user account;

determine that an amount of money associated with the second request is greater than the maximum transfer amount designated for the location where wagering is permitted;

based at least on a determination that the amount of money associated with the second request is greater than the maximum transfer amount designated for the location where wagering is permitted, deny the third request;

receive at least second GPS data from the smartphone;

based at least on the second GPS data, determine whether the user is in a location where (i) wagering is permitted and (ii) there is no maximum transfer amount;

receive, from the mobile gambling application, a third request to transfer money from the pre-permissioned financial account of the user to the user account; and while the current location of the user continues to be determined as the location where (i) wagering is permitted and (ii) there is no maximum transfer amount, approve the third request.

5. The system of claim 1, wherein the one or more server computers are configured to:

receive at least second GPS data from the smartphone;

based at least on the second GPS data, determine whether the user is in a location where casino wagering is not permitted and (ii) sports betting wagering is permitted;

i) receive a casino wager from the mobile gambling application associated with the user account; and while the current location of the user continues to be determined as the location where (i) casino wagering is not permitted and (ii) sports betting wagering is permitted, deny the casino wager.

6. The system of claim 1, wherein the one or more server computers are further configured to:

create the user account based on receiving at least one of a name of the user, an address of the user, or a social security number of the user.

7. The system of claim 6, wherein at least one of the name of the user, the address of the user, or the social security number of the user are received in person at a casino.

8. The system of claim 1, wherein to provide the user access to the user account via the mobile gambling application, the one or more server computers are configured to enable the mobile gambling application to display a balance of money in the pre-permissioned financial account.

9. A system comprising:

one or more server computers, each of the one or more server computers including at least one processor, the one or more server computers being configured to:

receive login information of a user from a mobile gambling application being executed on a smartphone, wherein the login information enables access to a user account established with a gaming operator of the mobile gambling application;

attempt to verify the login information;

based at least on successful verification of the login information, provide the user access to the user account via the mobile gambling application;

receive at least Global Positioning System (GPS) data from the smartphone while the smartphone executes the mobile gambling application;

based at least on the GPS data, determine whether the user is in a location where wagering is permitted;

based at least on a determination that the user is in the location where wagering is permitted:

receive, from the mobile gambling application, a request to wager a first amount of money on a game, wherein the first amount of money is in the user account;

while a current location of the user continues to be determined as the location where wagering is permitted, approve the request to wager;

based at least on the determination that the user is in a location where gambling is not permitted:

receive, from the mobile gambling application, a request to withdraw a second amount of money from the user account for deposit in a pre-permissioned financial account associated with a financial institution; and while the current location of the user continues to be determined as the location where wagering is not permitted:

deny the request to withdraw based at least on one of: the determination that the user is in the location where wagering is not permitted, or a determination that the second amount of money is greater than a maximum transfer amount.

10. The system of claim 9, wherein the one or more server computers are further configured to receive at least one of:

an Internet Protocol (IP) address;

an identifier of a network that the smartphone is connected to;

an identifier of a geofence in which the smartphone is located; or triangulation data; and wherein to determine whether the user is in the location where wagering is not permitted, the one or more server computers are configured to determine whether the user is in the location where wagering is not permitted based on at least the GPS data and one or more of the IP address, the identifier of the network that the smartphone is connected to, the identifier of the geofence in which the smartphone is located, or the triangulation data.

11. The system of claim 9, wherein the location where wagering is permitted is within a geofenced area at a casino property.

12. The system of claim 9, wherein the one or more server computers are further configured to:

receive at least second GPS data from the smartphone;

based at least on the second GPS data, determine whether the user is in the location where wagering is permitted;

receive, from the mobile gambling application, a second request to withdraw a third amount of money from the user account for deposit in the pre-permissioned financial account; and while the current location of the user continues to be determined as the location where wagering is permitted, approve the second request to withdraw.

13. The system of claim 12, wherein the one or more server computers are further configured to determine that the third amount of money is less than the maximum transfer amount designated for the location where wagering is permitted; and wherein the one or more server computers are configured to execute the second request to withdraw while the current location of the user continues to be determined as the location where wagering is permitted and the determination that the third amount of money is less than the maximum transfer amount.

14. The system of claim 9, wherein the second amount of money in the request to withdraw is less than or equal to the first amount of money in the request to wager.

15. The system of claim 9, wherein the one or more server computers are further configured to:

create the user account based on at least one of receiving a name of the user, an address of the user, and a social security number of the user.

16. The system of claim 15, wherein at least one of the name of the user, the address of the user, or the social security number of the user are received in person at a casino.

17. The system of claim 9, wherein to provide the user access to the user account via the mobile gambling application, the one or more server computers are configured to enable the mobile gambling application to display a balance of money in the pre-permissioned financial account.

18. The system of claim 4, wherein a determination that the current location of the user continues to be determined as the location where (i) wagering is permitted and (ii) there is no maximum transfer amount is further based on at least one of:

an Internet Protocol (IP) address;

an identifier of a network that the smartphone is connected to;

an identifier of a geofence in which the smartphone is located; or triangulation data.

19. The system of claim 5, wherein a determination that the current location of the user continues to be determined as the location where (i) casino wagering is not permitted and (ii) sports betting wagering is permitted is further based on at least one of:

an Internet Protocol (IP) address;

an identifier of a network that the smartphone is connected to;

an identifier of a geofence in which the smartphone is located; or triangulation data.

20. The system of claim 12, wherein a determination that the current location of the user continues to be determined as the location where wagering is permitted is further based on at least one of:

an Internet Protocol (IP) address;

an identifier of a network that the smartphone is connected to;

an identifier of a geofence in which the smartphone is located; or triangulation data.

* * * * *